Patented May 13, 1941

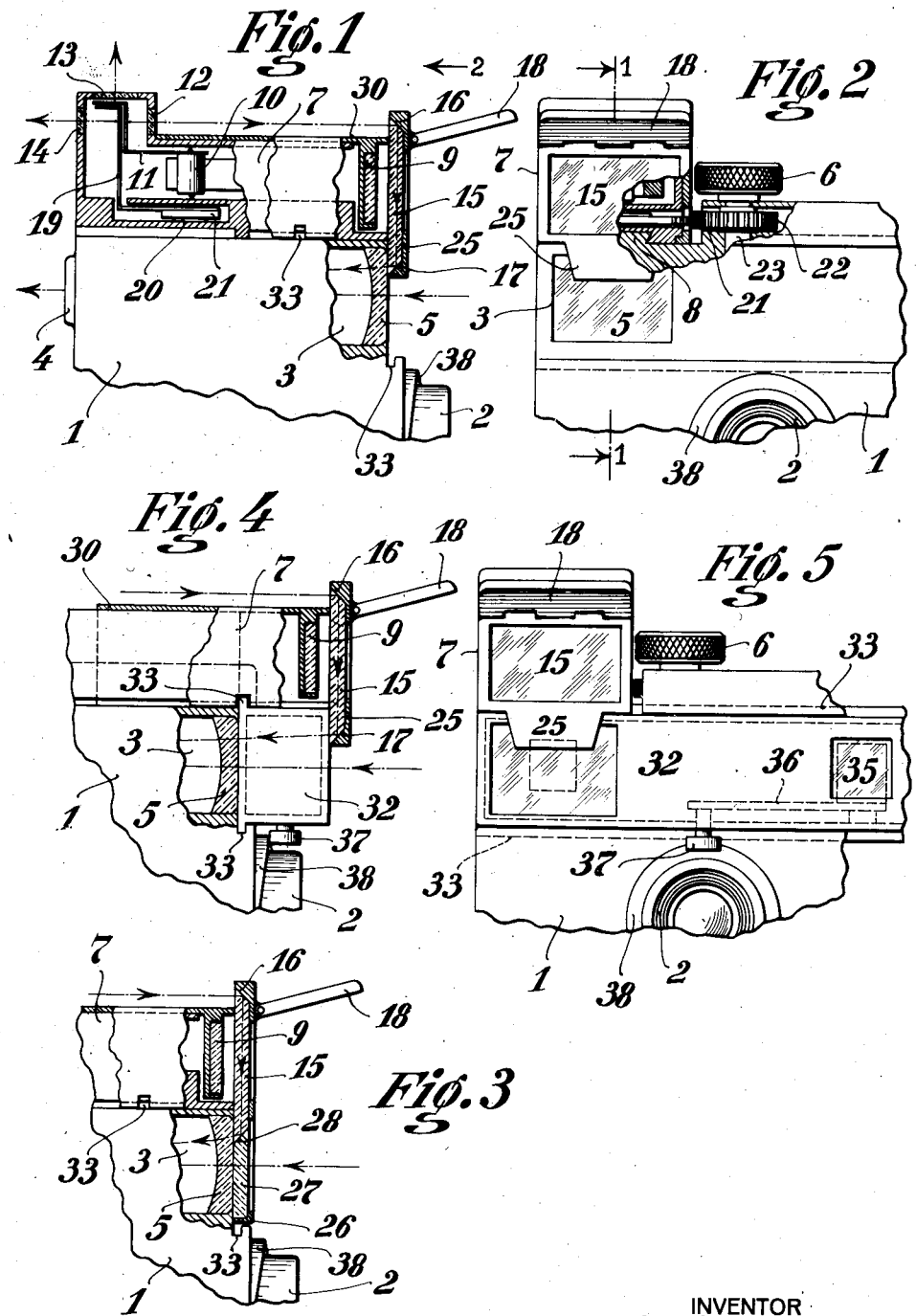

2,242,043

UNITED STATES PATENT OFFICE 2,242,043

EXPOSURE METER FOR PHOTOGRAPHIC APPARATUS

Otto Sanger, Helmut Becker, and Heinrich Broschke, Wetzlar, Germany, assignors, by mesne assignments, to Frank Dumur, Lausanne, Switzerland Application July 8, 1939, Serial No. 283,444
In Germany July 12, 1938

4 Claims. (Cl. 95—10)

This invention relates to improvements in exposure meters for photographic apparatus such as cameras, the exposure meter being of the type in which the exposure indicating elements, such as pointers, are seen in the field of view in a view finder or in a ranger finder, or in the combined fields of view of both such finders.

More particularly the invention relates to an exposure meter which may be built as a separate unit and thereafter attached to a camera. On the other hand, the features of the invention may be embodied in a built in exposure meter.

Exposure meters in which the exposure indicating elements are observable in the fields of observation of a camera are known. But heretofore they have been in the form of built in exposure meters. If a camera without any exposure meter was to be provided with an exposure meter, a great deal of rearrangement of the camera mechanism was necessary. Such work is expensive and in many cameras such additions are impracticable.

One object of this invention is to provide an exposure meter of the character described adapted to be attached to a camera and in which then the exposure indicating elements are observable in one of the fields of observation of the cameras.

Another object is to provide an adjustable exposure meter so arranged that it may be operated to provide for attaching a range finder between the exposure meter and the view finder of a camera, the exposure indicating elements then being seen in the combined fields of view of both the view finder and the range finder.

Still another object is to provide means whereby an auxiliary pointer is adjusted by hand to register with the exposure meter pointer, such adjustment automatically serving to adjust one of the exposure controlling elements of the camera to accord with the indicated exposure.

Other features of the invention will be pointed out hereinafter. Accordingly the invention is embodied in an exposure meter mechanism arranged and constructed as hereinafter described and as illustrated in the accompanying drawing in which Figure 1 is a view of a camera and view finder with an exposure meter according to this invention attached, parts being in section and broken away and certain parts omitted. The sectional parts are on the line 1—1 of Fig. 2.

Fig. 2 is a front view of the camera looking in the direction of arrow 2 in Fig. 1, parts being in section and parts broken away.

Fig. 3 is a fragmentary view of parts shown in Fig. 1 showing a modification.

Figs. 4 and 5 are views similar to Figs. 1 and 2 but show in addition a range finder included in the mechanism.

Referring to Figs. 1 and 2 the camera 1 may be of any suitable type provided with an objective 2. On top of the camera there is mounted a view finder 3 having an ocular 4 and an objective 5. The camera is provided with a manually operable element such as a knob 6 by means of which the shutter or the diaphragm may be adjusted. Neither the shutter, nor the diaphragm is shown.

The exposure meter 7 is mounted upon the camera by sliding it into position from the front, the camera having a fixed guide 8 and the exposure meter having a corresponding dove tail groove as seen in Fig. 2. The exposure meter contains a photoelectric cell 9 for operating the galvanometer 10 with the galvanometer needle 11 in the usual manner. At the rear end of the exposure meter there are light openings 12, 13 and 14 closed with glass plates. In front the exposure meter is closed by a glass plate 15 having the polished prismatic reflecting surfaces 16 and 17. When not in use the exposure meter is closed by a hinged cover 18. An auxiliary pointer 19 is pivoted at 20 and is provided with a toothed sector 21 in mesh with a gear 22 on the shutter setting shaft 23 which is operated by the knob 6. The finder objective 5 and the glass plate 15 are purposely not sectioned for the sake of clearness.

The exposure meter is used in the well known manner by opening the cover 18 and exposing the cell 9 to the incoming light rays from the object whereupon the galvanometer needle will make a corresponding movement to indicate the correct exposure. The movement of the needle 11 may be observed through any of the openings 12, 13 and 14 as may be most suitable and by rotating the knob 6 the auxiliary pointer 19 may be brought into alinement with the needle 11 whereby the shutter is adjusted for the correct exposure. As is indicated by dotted lines in the drawing the light rays forming the image of the pointers are through the opening 12 by the prismatic polished surfaces 16 and 17 directed into the view finder towards the eye of the observer who thus sees clearly and sharply the image of said pointers in the field of view of the objects.

It will be noted that in Fig. 1 a portion of the mounting 25 which supports the glass plate 15 extends downward in front of the view finder objective 5 and thus to some extent cuts off part of the field of view. This may be avoided by the modification shown in Fig. 3. Here the mounting for the glass plate 15 does not extend downward in front of the view finder, but another mounting 26 is provided which supports an additional glass plate 27 having a bevelled surface which is cemented to the corresponding bevelled surface on the plate 15 as shown at 28. The cemented surface 28 may be semi-transparent or entirely mirrored. In Fig. 3 therefore the incoming light rays to the view finder are not as much obstructed as in Fig. 1.

If it is desired to provide room for a range finder the exposure meter may be constructed as shown both in Figs. 1 and 4 where it will be seen that the photoelectric cell 9 and the objective glass plate 15 are carried by a slidable frame 30 which may be pulled forward as shown in Fig. 4 whereby room is provided between the view finder objective 5 and the exposure meter objective plate 15 in which to position a range finder 32. The latter is slid into position in transverse grooves 33, 33. The range finder is of usual construction indicated more particularly in Fig. 5 in which the movable prism 35 is operated by a lever 36 having a roller 37 which runs on the cam 38 of the objective 2. From Fig. 4 it is apparent that the image of the exposure indicating needle 11 appears in the fields of view of the range finder and of the view finder. It will further be noted that the construction is such that the range finder cannot be placed in position without first extending the parts of the exposure meter to the position shown in Fig. 4 and whereby a complete cooperation of the exposure meter, view finder, range finder and adjustment of the shutter is provided for.

We claim:

1. In a photographic camera having a view finder and shutter adjusting means, a gear on the latter, an exposure meter comprising a casing, an optical system within said casing adapted to cooperate with the optical system of said view finder, said exposure meter optical system including a galvanometer needle and an auxiliary needle adapted to be moved into registry with the galvanometer needle when the latter has been deflected, a gear on said auxiliary needle adapted to engage the gear on said shutter adjusting means when said exposure meter is attached to the camera, and cooperating means on the camera and said casing for detachably securing the casing to the camera with said gears in operative engagement and with the exposure meter optical system positioned in parallel optically operative relation with said view finder, the exposure meter optical system including optical means extending into the field of the view finder for imaging therein the said two needles after the same have been deflected and registered as aforesaid.

2. In a photographic camera having a view finder and a shutter adjusting knob, a gear on the latter, an exposure meter comprising a casing, an optical system within said casing including a galvanometer needle, an auxiliary needle, a gear on the latter, cooperating means on said camera and said casing for slidably detachably positioning the exposure meter on said camera in parallel optical operative relation to said view finder and for simultaneously therewith moving said auxiliary needle gear into engagement with the shutter knob gear, said exposure meter optical system including an optical element which overlaps the field of view of said view finder for imaging therein the said two needles.

3. In a photographic camera having a view finder, an exposure meter having an optical system, means on the camera and on the exposure meter for detachably securing the latter to the camera in parallel optical operative relation to the view finder and in predetermined axial relation thereto, a range finder and means on the camera and said range finder for detachably securing the latter to said camera with the optical system of the range finder interposed between and in optically operative relations to the optical systems of the view finder and the exposure meter.

4. In a photographic camera having a view finder, an exposure meter including a casing, an exposure meter optical system within said casing, a glass plate in said system for closing the objective end of said exposure meter, said glass plate having reflecting surfaces, means on the camera and said casing for securing the exposure meter to the camera in optically operative relation to said view finder with said glass plate in position to direct the image forming rays of said exposure meter optical system into the optical system of the view finder by reflection from said reflecting surfaces, means for supporting said glass plate in telescopic relation to the exposure meter casing whereby to space said glass plate axially a distance away from the objective of the view finder, a range finder and means for positioning the range finder in the space provided by telescopically positioning said glass plate as aforesaid with the optical system of the range finder interposed in optically operative relation to the objective of the view finder and said glass plate and between the same, the image forming rays of said exposure meter passing through said glass plate and by reflection therefrom into and through the optical system of the range finder into the field of view of the view finder.

OTTO SANGER.
HELMUT BECKER.
HEINRICH BROSCHKE.